United States Patent [19]

Nagata

[11] Patent Number: 4,541,007

[45] Date of Patent: Sep. 10, 1985

[54] STEREOSCOPIC COLOR TELEVISION SYSTEM

[76] Inventor: Kiyoshi Nagata, 209, Kosugicho 2 chome, Nakahara-ku Kawasaki-shi, Kanagawa 211, Japan

[21] Appl. No.: 395,031

[22] PCT Filed: Aug. 15, 1981

[86] PCT No.: PCT/JP81/00178

§ 371 Date: Jun. 15, 1982

§ 102(e) Date: Jun. 15, 1982

[87] PCT Pub. No.: WO82/01973

PCT Pub. Date: Jun. 10, 1982

[30] Foreign Application Priority Data

Dec. 1, 1980 [JP] Japan .............................. 55-168001

[51] Int. Cl.³ .................. H04N 9/60; H04N 9/54; H04N 7/08
[52] U.S. Cl. .............................. 358/3; 358/88; 358/102; 358/91; 358/92; 350/130; 354/101; 354/112
[58] Field of Search ............... 358/3, 88, 142, 146, 358/91, 92; 350/130, 396; 354/101, 112

[56] References Cited

U.S. PATENT DOCUMENTS 3,674,921 7/1972 Goldsmith .................. 358/91
3,688,045 8/1972 Olakoshi .................... 358/91

Primary Examiner—Howard W. Britton
Assistant Examiner—John K. Peng

Attorney, Agent, or Firm—Frishauf, Holtz, Goodman & Woodward

[57] ABSTRACT

Five color television cameras take pictures of an object. A video signal from the central camera is transmitted by circuitry substantially the same as the circuitry used in existing color television system. The video signal is subtracted from four video signals from the other cameras, two located on the left side of the central camera and the remaining two on the right side thereof, thus generating four video difference signals. A carrier wave is used of frequency 1/n (n is an integer) of the color sub-carrier frequency, and placed within the lower sideband of the reference frequency of an assigned channel. The spectrum distribution of the wave remains in interleaving relation with the spectrum distribution of a luminance signal from the central camera. The carrier wave is divided into two-phase carrier waves. Each of these carrier waves is divided into a positive halfwave and a negative halfwave. The resultant four halfwaves are amplitude-modulated by the four video difference signals, and the amplitude-modulated halfwaves are superposed one upon another, thus providing a composite wave. The composite wave is band-limited so that it does not exceed the bandwidth of the channel assigned and then transmitted. At the receiving side, five video signals are reproduced. Three electron beams corresponding to the three primary colors, are in synchronism with the five video signals, thereby to reproduce five pictures in stereoscopic relation on the focal plane of a lenticular lens screen.

6 Claims, 15 Drawing Figures

F I G. 2
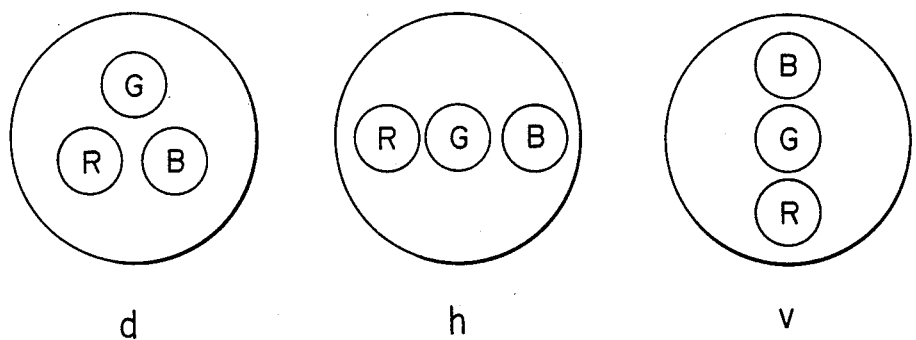
F I G. 3
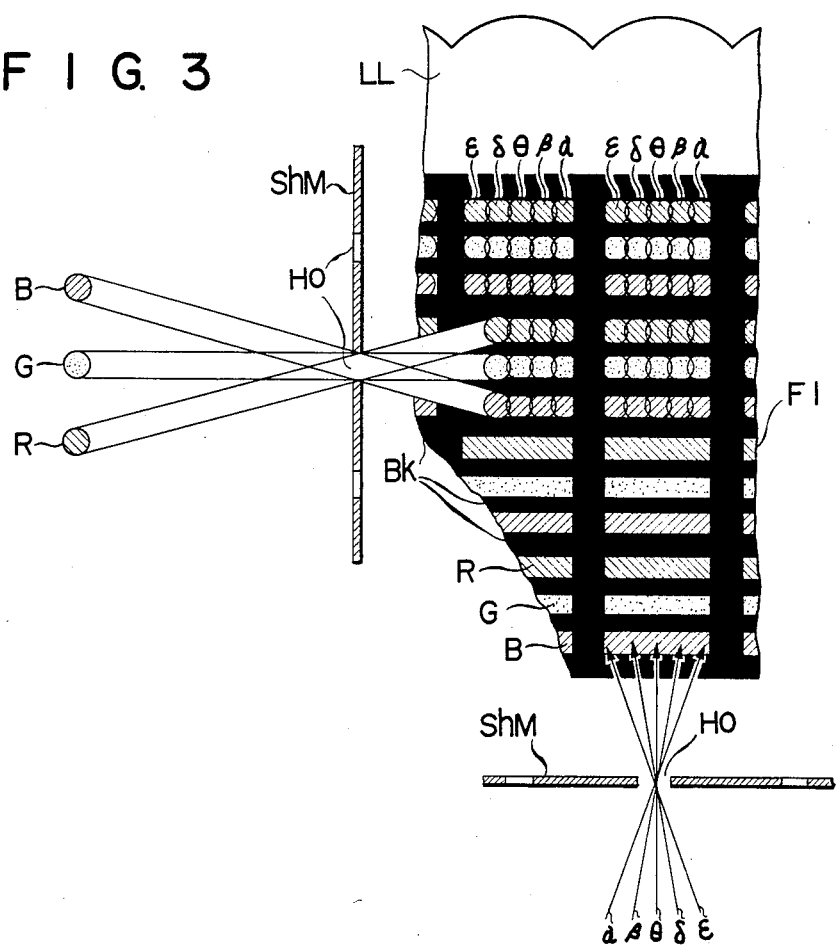

FIG. 4
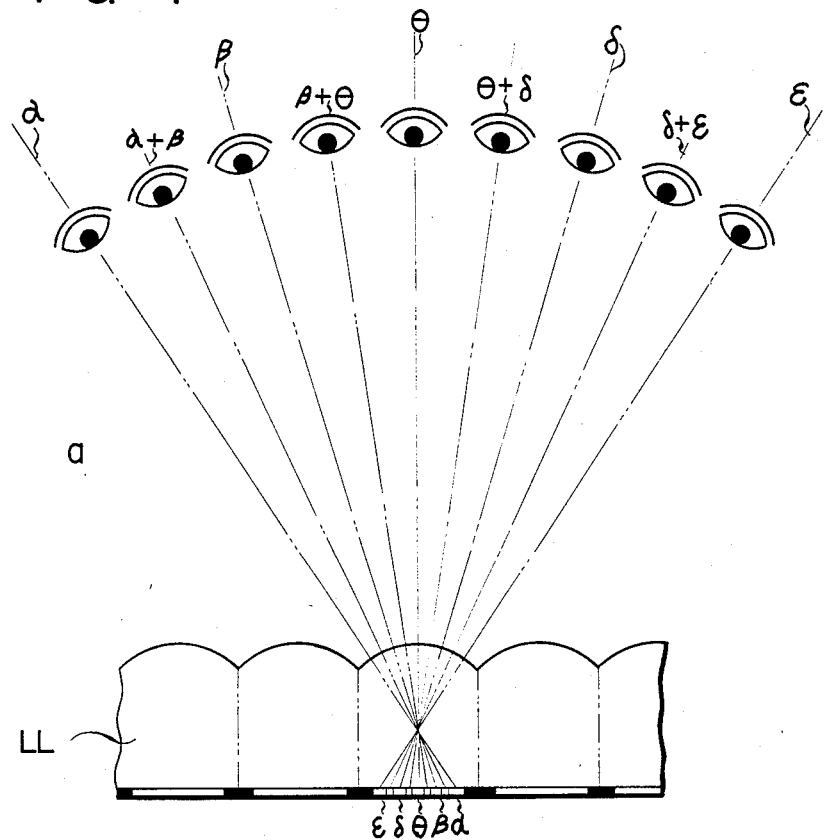
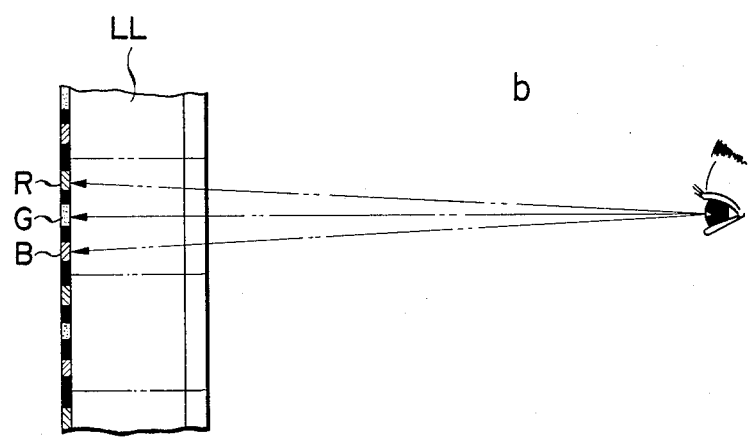

FIG. 6
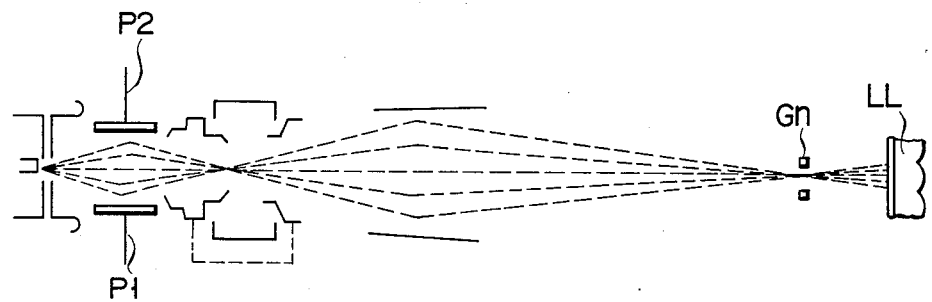
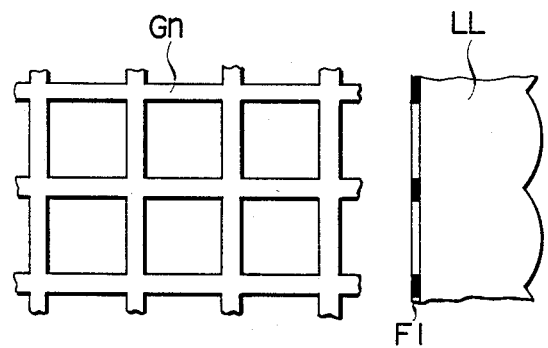
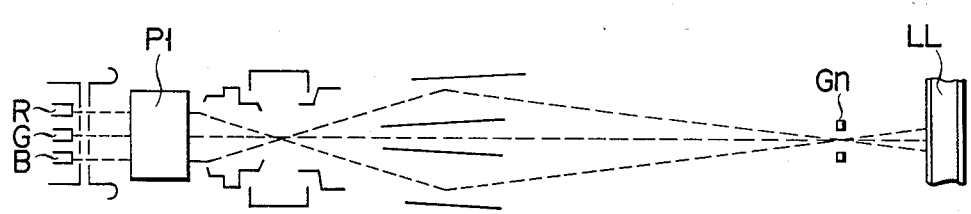

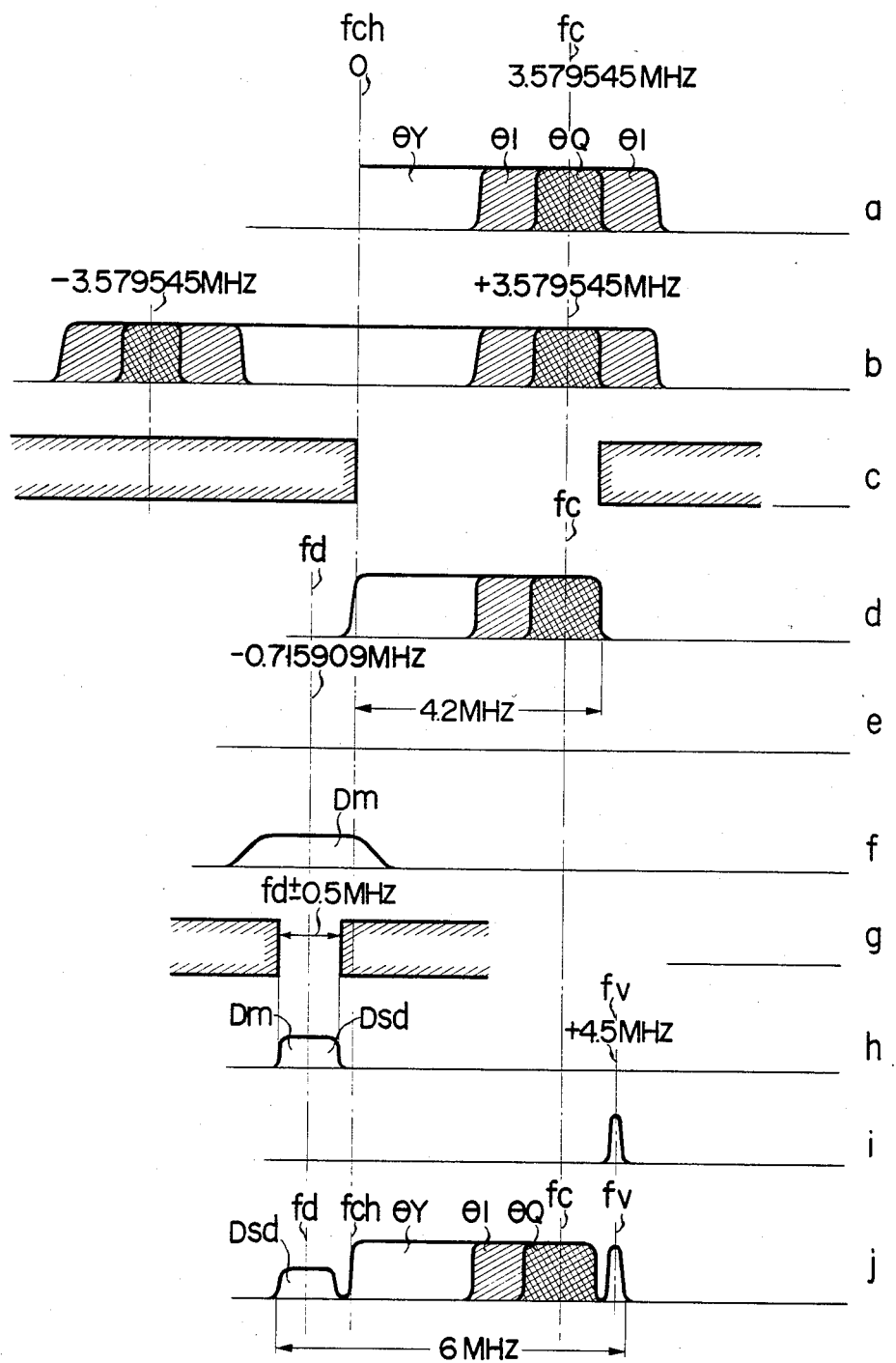

STEREOSCOPIC COLOR TELEVISION SYSTEM

TECHNICAL FIELD

This invention relates to a stereoscopic color television transmitting and receiving system which uses a lenticular screen.

BACKGROUND ART

In various countries of the world, attempts have been made to provide a stereoscopic color television transmitting-receiving system. None of them has brought a satisfactory result, however. In order to make a new system compatible with the existing systems such as NTSC, SECAM or PAL system, it is necessary to shut out ordinary light so that a holographic, stereoscopic picture may be taken and then transmitted. For the same purpose it is also necessary to solve many problems, such as protection of the human body against laser beams. All in all, it seems almost impossible at present to make the bandwidth of a required carrier wave fall within the bandwidth of the existing systems.

It is easy to provide a system which uses two cathode ray tubes of the same size for reproducing two pictures in a stereoscopic relation, and two polarized glass filters which are disposed on the screens of the cathode ray tubes and different in phase by 90°. Through the glass filters and through polarized eyeglasses a stereoscopic picture may be seen by both eyes of a viewer. But the receiver is inevitably bulky, and the viewer cannot see a stereoscopic picture unless he wears polarized eyeglasses.

Other two-picture systems, a complementary color picture system and a synchronized liquid crystal eyeglass system, are under development. Either system needs specially designed eyeglasses or a viewing aid. Without wearing the special eyeglasses or using the viewing aid, a viewer cannot see a stereoscopic picture.

An attempt has been made to provide a system which uses a lenticular screen in combination with two stereoscopic pictures so that a viewer may watch a stereoscopic picture without wearing a specially designed viewing aid. (For example, U.S. Pat. No. 3,674,921 discloses such a system.) The system is theoretically unworkable. A viewer can watch a stereoscopic picture only when he stands in front of the screen. If he stands at other positions, he can watch but a flat picture or, in worst case, a pseudoscopic picture in which far and near are replaced with each other. This system is therefore not practical.

DISCLOSURE OF INVENTION

It is an object of the invention to provide a stereoscopic color television system which is compatible with the existing monochrome or color television systems, which uses only one cathode ray tube provided with one set of color electron guns and which can yet produce a stereoscopic picture that a viewer can see from any direction at the front of the cathode ray tube without wearing special eyeglasses or using a viewing aid.

Another object of the invention is to provide a stereoscopic color television system which enables simultaneous transmission and reception of five picture signals taken by five cameras arranged in a stereoscopic relation.

It is desired that as many pictures as possible be arranged in the form of stripes below the focal plane of the lenticular lenses constituting the lenticular screen of a stereoscopic color television receiver. But five pictures are good enough. This may be proved true by the fact that stereoscopic color pictures available on the market are each composed of five pictures.

U.S. Pat. No. 4,164,748 (Japanese Patent Application No. 51-35114, Disclosure (Kokai) No. 52-119818), of which the inventor hereof is the owner, discloses a system which not only is compatible with the existing monochrome and color television systems but also provides a picture whose density seen by a single eye and whose color rendering are equal to those provided by the existing systems. Nonetheless, the system is disadvantageous in the following two respects because it employs sequential transmission method.

1. If a picture is transmitted by said system and received by receivers for the existing system, since pictures in stereoscopic relation are superposed one upon another, the more stereoscopic the picture is, the more blurred the reproduced picture will be.

2. Since a picture reproduced has the same density as those reproduced by the existing systems, flickering will likely appear on the screen. This is because the number of pictures transmitted every second is reciprocal to the number of cameras used to provide a stereoscopic picture.

The present invention is an improvement to the invention disclosed in the above-noted U.S. Patent, of which the applicant is the owner. The important features of the improvements are as follows:

1. Although the number of pictures transmitted by the system of the U.S. Patent is limited to three in order to provide compatibility with the existing systems. The present invention enables simultaneous transmission of five pictures.

2. Since the system of the U.S. Patent employs 3-picture sequential transmission method, the pictures, if reproduced by the existing monochrome or color television receiver tend to blur more or less. Such unwanted phenomenon does not take place in the system according to the present invention because only the picture taken by the central camera is reproduced.

3. The present invention uses five color video cameras to televise a scene. The scene taken by the central camera is transmitted by substantially the same method as used in the existing systems. The picture signals obtained by two cameras positioned on the left of the central camera and the picture signals obtained by the two cameras positioned on the right of the central camera are each compared with the signal obtained by the central camera to produce four video difference signals. Four difference signals are transmitted by one carrier wave, in the following method.

4. Two amplitude-modulated signals may be transmitted by two carrier waves which are 90° out of phase and which have the same frequency. I and Q signals of a color sub-carrier wave may be accepted in evidence of this.

5. Carrier waves of the same frequency and the same phase are amplitude-modulated by two different signals, and rectified into negative halfwave and positive halfwave, respectively. Then, the positive and negative rectified components are joined together, thus providing a composite carrier wave which contains two signals. Therefore, by combining paragraphs 4 and 5, the transmission of four signals with one carrier wave is made possible. Such a carrier wave is made up of four vectors, which are in 90° phase relation with respect to each other, and which have different values. Hence it is impossible that any two neighboring vectors interfere with each other. Moreover, the vectors 180° out of phase with respect to each other would not interfere or cancel out each other because one is a positive halfwave and the other is a negative halfwave and both are joined at the position of zero potential.

6. To transmit the video difference signals mentioned in paragraphs 4 and 5 with one carrier wave, use is made of a side band on the opposite side of color sub-carrier wave with respect to the reference frequency in assigned channel, which corresponds to the lower sideband of the reference frequency in the assigned channel in the existing color television systems. The composite video difference signal carrier must have such a frequency as to maintain the frequency spectrums of the band and the luminance signal in an interleaving relation, lest the band and the luminance signal from the central camera should interfere. Such a frequency may be chosen from the integral fractions of the frequency of the color sub-carrier wave. In NTSC system, for example, the frequency may be one-fifth or one-seventh of the frequency of the sub-carrier wave. In the best mode of the invention, which will later be described, one-fifth of the frequency of the sub-carrier wave is selected.

As mentioned above, the composite color difference signal carrier contains four information signals. The amplitude of the carrier as well as the frequency band thereof is, if necessary, limited so that its frequency band may not swell out the frequency band of the assigned channel and its frequency band may not affect the color signals from the central camera.

7. The video signal from the central camera transmitted in said manner and four video signals recovered from the composite video difference signal are used to reproduce the color picture information obtained by the five video cameras at the transmission side.

8. If five color picture information are arranged by three primary color electron guns on the phosphor screen on each focal plane of a lenticular lens assembly within 1 Hz of color sub-carrier wave and in a predetermined sequence, then a viewer can see a stereoscopic picture similar to stereoscopic color photographs now available on the market. Unlike the color stereoscopic photograph sold in the market, the reproduced stereoscopic picture is in motion.

9. To arrange the five color picture data in said manner, the data are each arranged within the next 1 Hz, delayed by 1 Hz in a color sub-carrier wave every time its phase is shifted by 60°, whereby the five color picture data are applied to the control grids of the three primary color electron guns in a specific order.

10. Consequently, electron beams from the three electron guns, R, G and B guns arranged on vertical line, are shifted in synchronism with the five video signals by means of shifting electrodes which are included in the cathode ray tube.

11. To shift the electron beams in synchronism with the video signals, use is made of a ring counter circuit which is a 6-bit RS master-slave flip-flop having a preset terminal and a clear terminal.

BRIEF DESCRIPTION OF DRAWINGS

FIG. 2 shows arrangements of three primary color electron guns.

FIG. 3 sechmatically illustrates the arrangement of three primary colors on the phosphor surface of a cathode ray tube used in the present invention.

FIG. 4 illustrates the principle as to how a color stereoscopic view is provided according to the invention.

FIG. 6 represents the structure of a cathode ray tube of meshy focusing grid type.

FIG. 9 illustrates a frequency spectrum in an assigned channel, according to the present invention.

BEST MODE OF CARRYING OUT THE INVENTION

Figure 1:
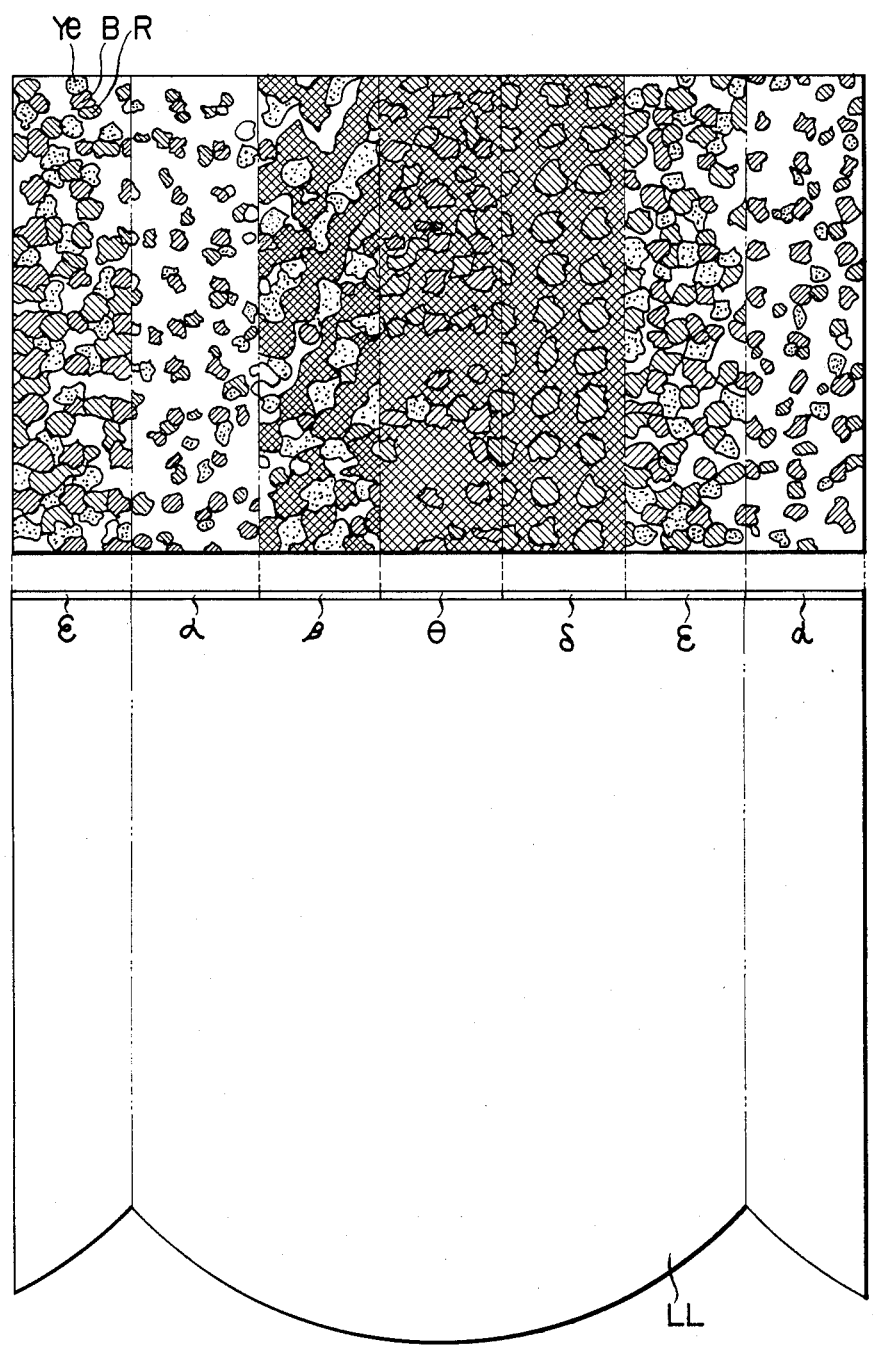
FIG. 1 is a microscopically enlarged view of a part of a stereoscopic photo with a lenticular sheet removed.

FIG. 1 is a microscopically enlarged view of a part of a stereoscopic color photo available on the market, with its lenticular sheet removed, and shows the positional relation between the picture and a lenticular lens LL. Under one LL five vertical stripes $\alpha$, $\beta$, $\theta$, $\delta$ and $\epsilon$ are provided. On each stripe there are laid a number of small subtractive three primary color spots, red spots R, yellow spots Ye and blue spots B. If the same pattern is reproduced on the phosphor screen of a cathode ray tube of a stereoscopic color television system and is viewed through a lenticular lens assembly, a stereoscopic picture may be seen from any direction in front of the cathode ray tube.

In the case of the stereoscopic color television additive three primary colors, red R, green G and blue B, are used instead. With a stereoscopoic color television system of the 3-gun scanning type, it is practically impossible to produce countless small, large flashes of three primary colors in such way as possible with a stereoscopic photograph. It is therefore better to form a picture element of R, G and B color spots in a stereoscopic color television system as well as the existing colot television. With a stereoscopic color television, either eye of a viewer is directed to a picture element consisting of R, G and B color spots arranged in one vertical stripe which is positioned under an LL. Hence, in order to obtain a picture of a correct color rendering, it is absolutely necessary to arrange the three primary color spots R, G and B in a vertical line. This is achieved by arranging R, G and B electron guns in a vertical line, so that the three electron beams land on the phosphor surface, forming three color spots arranged also in a vertical line.

FIG. 2 shows various arrangements of electron guns. FIGS. 2(d) and 2(h) illustrate the delta arrangement and the horizontal line arrangement, respectively, which are predominantly used in the present color television systems. These arrangements cannot help to arrange electron beams in a vertical line. The present invention employs such a vertical line arrangement as shown in FIG. 2(v), as already described in the applicant's U.S. Pat. No. 4,164,748.

FIG. 3 is an enlarged view of a part of a phosphor surface which emits light when radiated by electron beams. Electron beams R, G and B for reproducing a stereoscopic color picture reach the phosphor surface F1 through one hole Ho of a shadow mask ShM. On the phosphor surface F1 black shades Bk are provided so that the electron beam spots may not be mixed up in the vertical direction. By contrast, a black partition should not be provided between the pictures $\alpha$, $\beta$, $\theta$, $\delta$ and $\epsilon$, which are put in stereoscopic relation and each of which contains spots of three primary colors, i.e. red spots R, green spots G and blue spots B in order for the electron beams R, G and B to partially overlap one another in the horizontal direction so that intermediate pictures are produced. In this way, the pictures with three primary colors R, G and B stretch continuously on the phosphor surface F1 from $\alpha$ to $\epsilon$, holding the stereoscopic relation, and whatever vertical stripe portion of the phosphor surface F1 has three primary colors of the same picture, enabling a stereoscopic view with complete color rendering, regardless of the position of the viewer in front of the cathode ray tube.

FIG. 4 illustrates how such a stereoscopic view is provided. FIG. 4(a) shows the case of viewing horizontally through LL pictures represented in FIG. 3. The viewer may see the picture $\alpha$, $\beta$, $\theta$, $\delta$ or $\epsilon$ depending on the position of his eye. In some cases he may see an intermediate picture $\alpha+\beta$, $\beta+\theta$, $\theta+\delta$ or $\delta+\epsilon$. If the pictures are in stereoscopic relation with each other, the viewer may see with both eyes a stereoscopic picture no matter where he stands in front of the screen. FIG. 4(b) is a side view. In the vertical direction the LL do not have lens effect. Since the electron beam spots R, G and B of each picture element are arranged in a vertical line, the viewer can see a picture with perfect color rendering.

Figure 5:
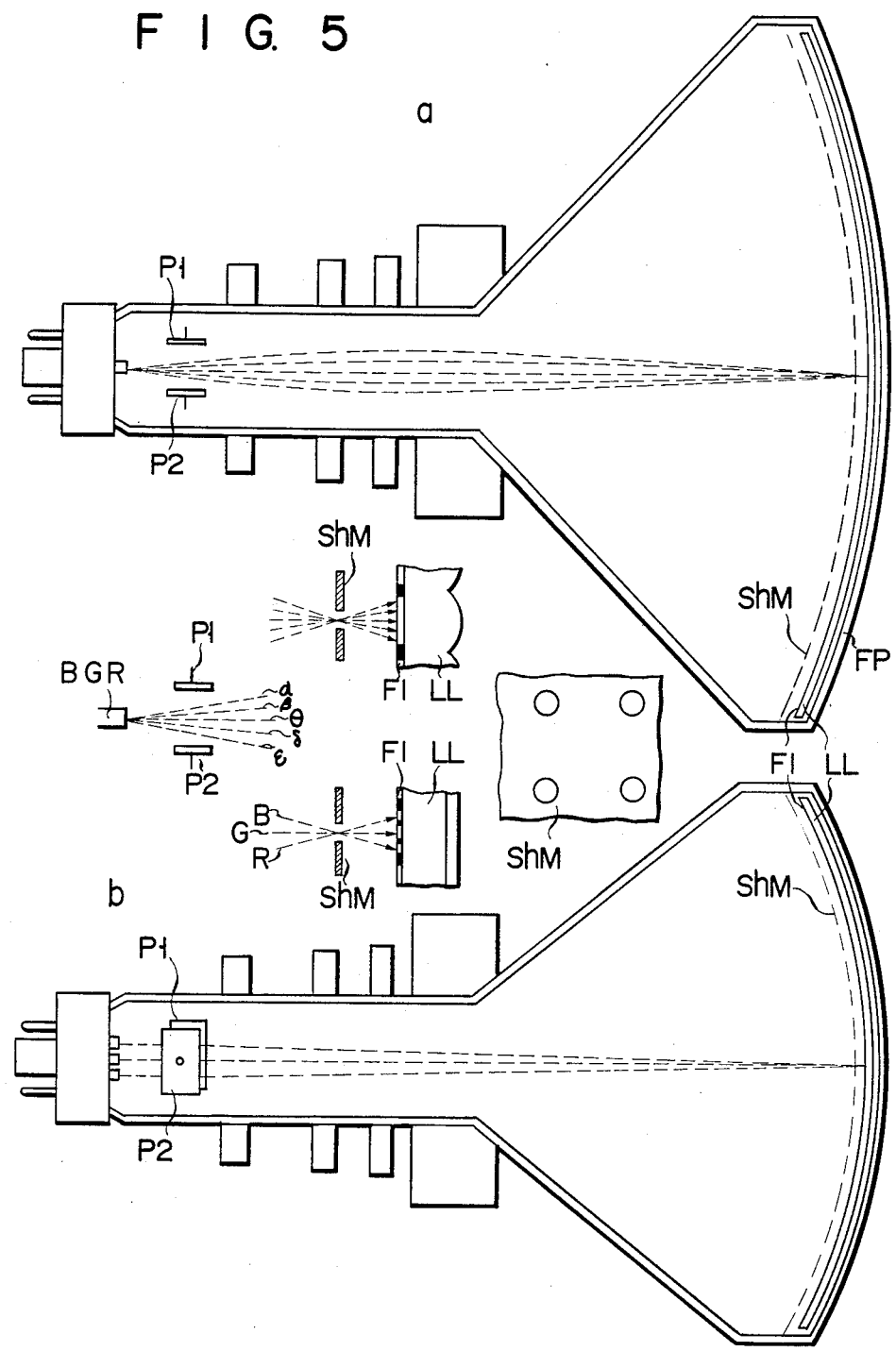
FIG. 5 shows the structure of a cathode ray tube of shadow mask type.

FIG. 5 shows the structure of a cathode ray tube of shadow mask type. The cathode ray tube differs from the cathode ray tube used in the existing color television system in the following respects.

1. Electron guns, R, G and B are arranged side by side in a vertical line.

2. Two shifting electrodes P1 and P2 are provided to shift, either to the left or to the right, three electron beams emitted from the electron guns and arranged in a vertical line.

3. Three primary colors R, G and B on the phosphor screen are arranged in such a pattern as shown by F1 in FIG. 3.

4. A lenticular screen LL having convex lens effect only in the horizontal direction is provided on the side of a face plate FP of the phosphor screen F1.

FIG. 6 shows the structure of a cathode ray tube which has a meshy focusing grid Gn in place of a shadow mask. To the meshy focusing grid Gn there is applied a voltage which is much lower than anode voltage, e.g. a voltage about 15 KV lower than the anode voltage. With this cathode ray tube the electron beams are focused without any part of them shut out, unlike with the cathode ray tube of the shadow mask type. The beams are thus more intensive and form a brighter picture on the screen, as is described in the applicant's U.S. Pat. No. 4,164,748.

Figure 7:
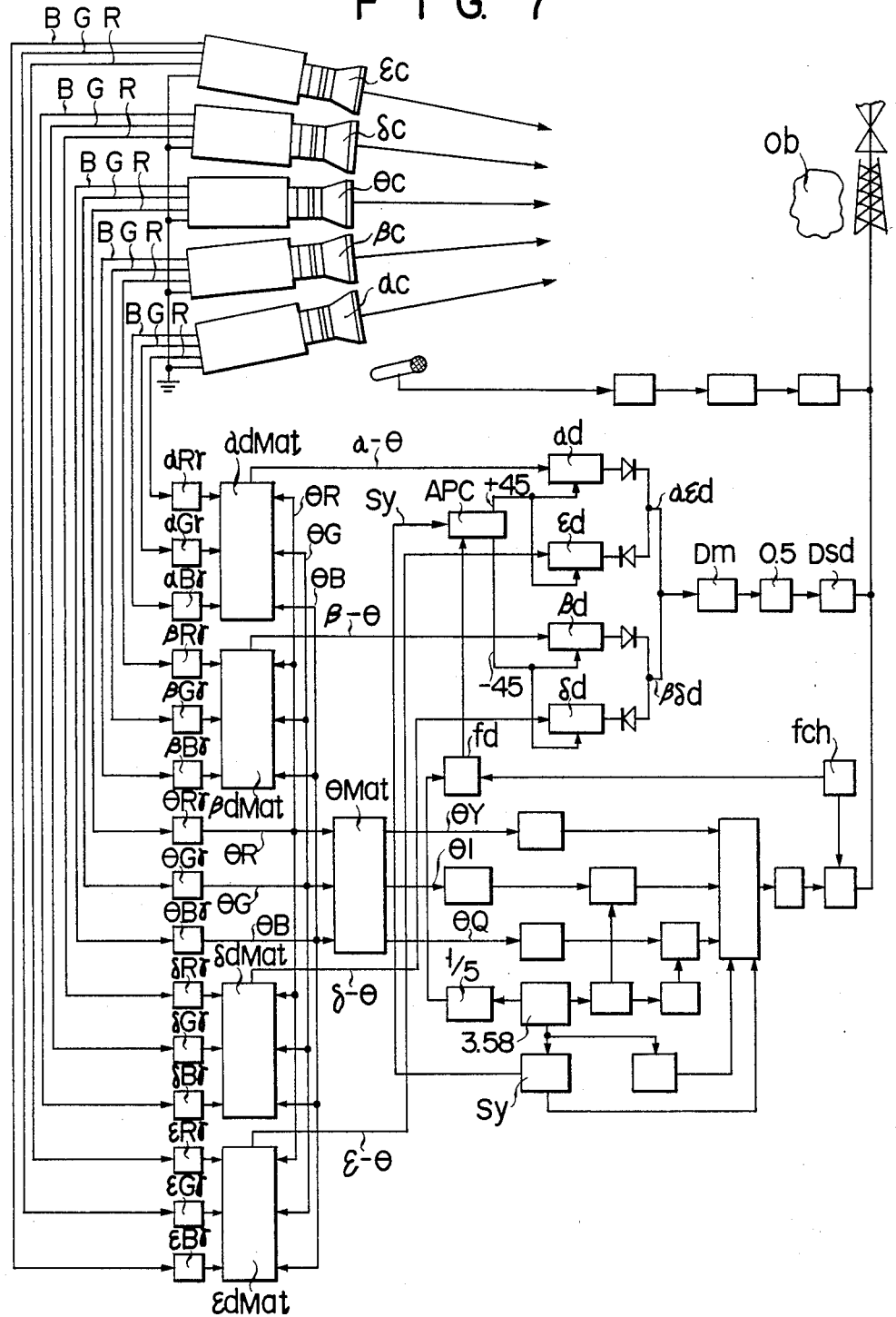
FIG. 7 is a diagram of a stereoscopic color television transmitter embodying the present invention.

FIG. 7 is a block diagram of a stereoscopic color television transmitting system according to the present invention. In FIG. 7, $\alpha c$, $\beta c$, $\theta c$, $\delta c$ and $\epsilon c$ designate color television cameras set up in front of an object Ob and spaced at proper intervals from one another, thereby to take a stereoscopic picture of the object Ob. Outputs of these cameras, which represent three primary colors R, G and B, are gamma-corrected by gamma correction circuits $\alpha R\gamma$, $\alpha G\gamma$, $\alpha B\gamma$, $\beta R\gamma$, $\beta G\gamma$, $\beta B\gamma$, $\theta R\gamma$, $\theta G\gamma$, $\theta B\gamma$, $\delta R\gamma$, $\delta G\gamma$, $\delta B\gamma$, $\epsilon R\gamma$, $\epsilon G\gamma$ and $\epsilon B\gamma$ to produce video signals $\alpha c$, $\beta c$, $\theta c$, $\delta c$ and $\epsilon c$. Of the video signals thus produced, the video signals from the central camera $\theta c$ is divided by a matrix circuit $\theta$Mat into a luminance signal $\theta Y$, chrominance signals $\theta I$ and $\theta Q$ and transmitted in substantially the same method as in the existing color television system. The transmission of the central camera signals differs on the following point. The existing system, for example NTSC system, uses a band ranging from (fch−1.25 MHz) to (fch+4.2 MHz), where fch is the reference frequency of a channel assigned for transmitting video signals. By contrast, the present invention spares the minus band as much as possible to transmit video difference signals $\alpha-\theta$, $\beta-\theta$, $\delta-\theta$ and $\epsilon-\theta$, which are produced by subtracting the video signal generated by the central camera $\theta c$ from the four other video signals $\alpha c$, $\beta c$, $\delta c$ and $\epsilon c$, respectively. The four video difference signals are produced by $\alpha$dMat, $\beta$dMat, $\delta$dMat and $\epsilon$dMat. MOre specifically, signal $\alpha-\theta$ is obtained from $\alpha R-\theta R$, $\alpha G-\theta G$ and $\alpha B-\theta B$, signal $\beta-\theta$ from $\beta R-\theta R$, $\beta G-\theta G$ and $\beta B-\theta B$, signal $\delta-\theta$ from $\delta R-\theta R$, $\delta G-\theta G$ and $\delta B-\theta B$, and signal $\epsilon-\theta$ from $\epsilon R-\theta R$, $\epsilon G-\theta G$ and $\epsilon B-\theta B$. Then, a video difference signal carrier wave fd is amplitude-modulated by these four video difference signals. It should be noted that since these video difference signals are composed of three primary colors R, G and B, respectively, the frequency of each video difference signal is 3.579545 MHz, while the frequency of the carrier wave fd modulated by the signals is one fifth of the former, i.e., a divided frequency of 0.715909 MHz. Therefore, the modulated wave includes a fifth harmonic. Such a method is used in U.S. Pat. No. 3,674,921. This U.S. Patent adopts a two-picture system so that only one video difference signal is used. Whereas, the present invention makes it possible to transmit simultaneously four video difference signals. Before this step is taken, the carrier fd is applied to an automatic phase control circuit APC to be phase-shifted by +45° and −45°. The former is amplitude-modulated by $\alpha-\theta$ and by $\epsilon-\theta$, independently, thus generating two modulated waves $\alpha d$ and $\epsilon d$ which have the same phase of +45° and different amplitudes. The positive halfwave of $\alpha d$ and the negative halfwave of $\epsilon d$ are put together, thus producing $\alpha\epsilon d$. The latter is amplitude-modulated by $\beta-\theta$ and by $\delta-\theta$, independently, thereby generating two modulated waves $\beta d$ and $\delta d$ which have the same phase of −45° and different amplitudes. The positive halfwave of $\beta d$ and the negative halfwave of $\delta d$ are combined, thus producing $\beta\delta d$. $\alpha\epsilon d$ and $\beta\delta d$ thus produced have the same frequency and 90° out of phase with respect to each other and do not interfere with each other. They are superposed one upon the other, thus synthesizing a composite video difference signal carrier Dm.

Figure 8:
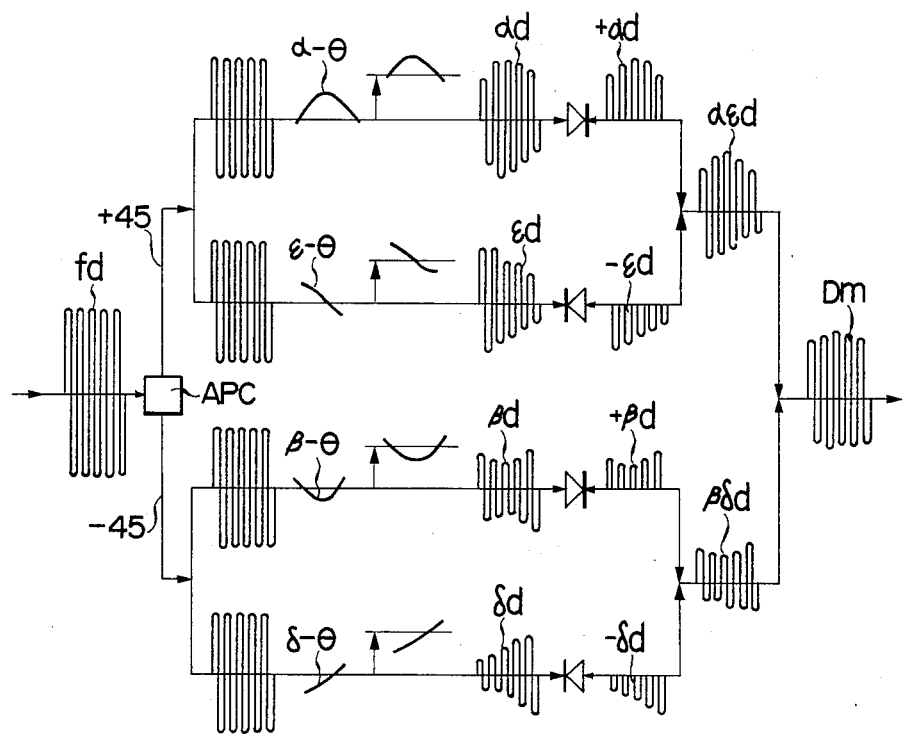
FIG. 8 is a diagram for explaining video difference signals.

FIG. 8 illustrates the above-mentioned processes. The carrier wave Dm thus provided contains four video difference signal information in the fifth harmonic and the frequency band thereof is broadened. The bandwidth is limited to ±0.5 MHz by a bandwidth limiting circuit 0.5 which is shown in FIG. 7. Thus, the carrier wave Dm is transmitted as a composite video difference signal carrier wave Dsd whose bandwidth falls within that of the assigned channels.

This method may, however, distort a little the video difference signals. Therefore, use is made of an XZ axis demodulation system to demodulate the video difference signals at the receiving side. This is because the XZ axis demodulation system can demodulate color signals with a narrow band of ±0.5 MHz.

FIG. 9 shows the frequency distribution of each signal within the channel assigned, according to the present invention. As shown in FIG. 9(d), the video signal from the central camera $\theta c$ is limited to 0 to 4.2 MHz with respect to the reference frequency fch of the assigned channels. This differs from the existing color television system only in that the minus side is removed. The frequency fv of the audio signal carrier is totally the same as in the existing system, as well understood from FIGS. 9(i) and 9(j).

A characterizing feature of the invention is that a composite video difference signal Dm has its frequency band limited to a range of ±0.5 MHz centered at the frequency fd lower than the reference frequency of an assigned channel by 1/5 of the color sub-carrier frequency in order for the overall bandwidth of the channel not to exceed 6 MHz.

Figure 10:
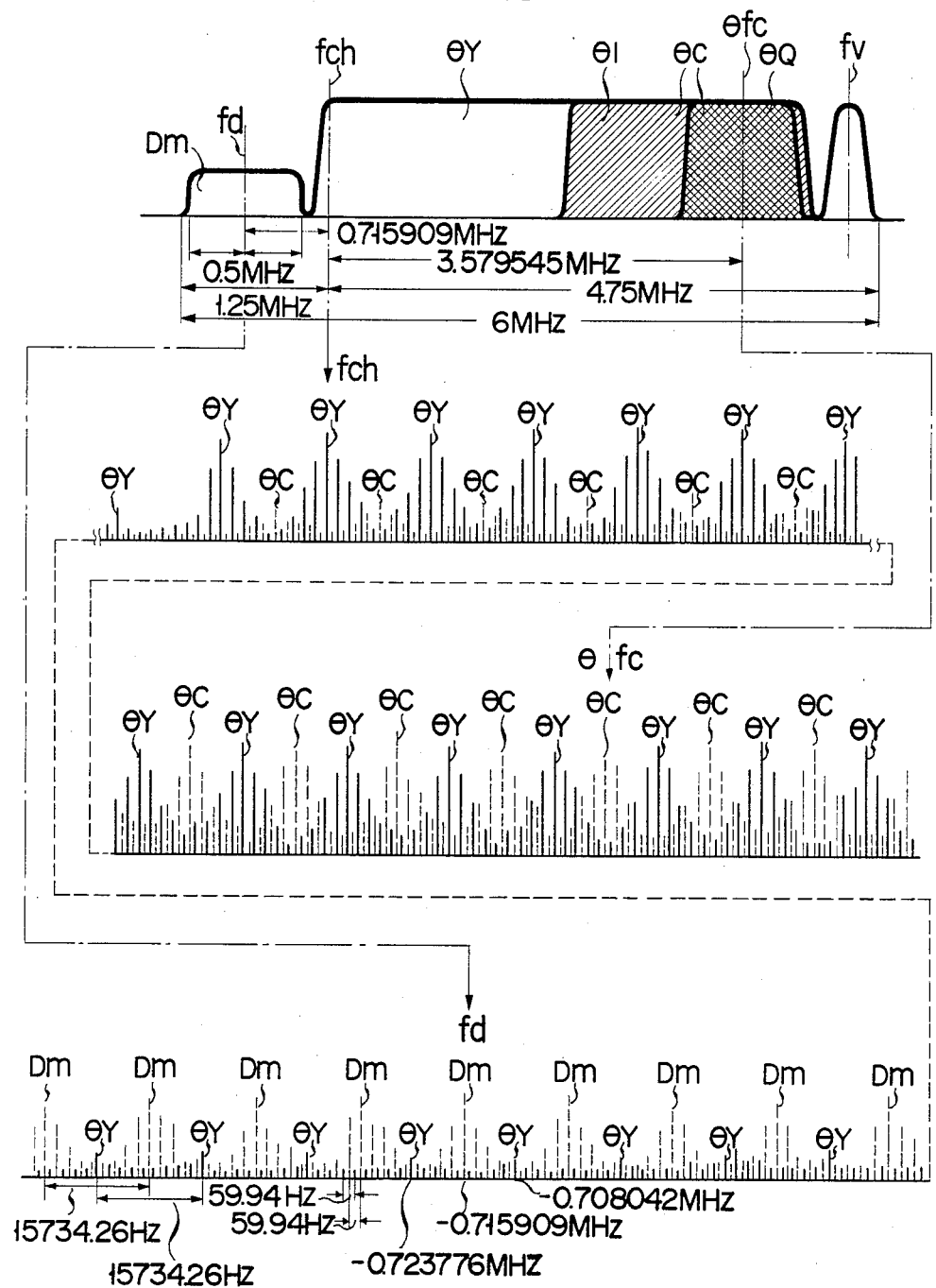
FIG. 10 is a graph showing the spectrum distribution of the assgined channel.

FIG. 10 shows the spectrum distribution of a luminance signal $\theta Y$ around the reference video carrier fch of the central camera $\theta c$, the spectrum distribution around the color sub-carrier (fch+3.58 MHz), or fc and the spectrum distribution around fd of the composite video difference signal carrier Dm. Particularly, FIG. 10 shows that the reference frequency fd is selected such that Dm and $\theta Y$, the key feature of the present invention, have their spectrum distributions put in an interleaving relation and therefore do not interfere each other. That is, fd is −0.715909 MHz if the reference frequency fch of the channel assigned is 0. This value is 45.5 times as high as the horizontal synchronization frequency fH, 15734.26 Hz. The spectrum distributions of $\theta Y$ on both sides of fd are thus −0.708042 MHz for 45th of fH and −0.723776 MHz for 46th of fH. Moreover, the spectrum distributions do not mutually interfere because vertical synchronization frequency fV, 59.94 Hz is also in an interleaving relation as shown.

Figure 11:
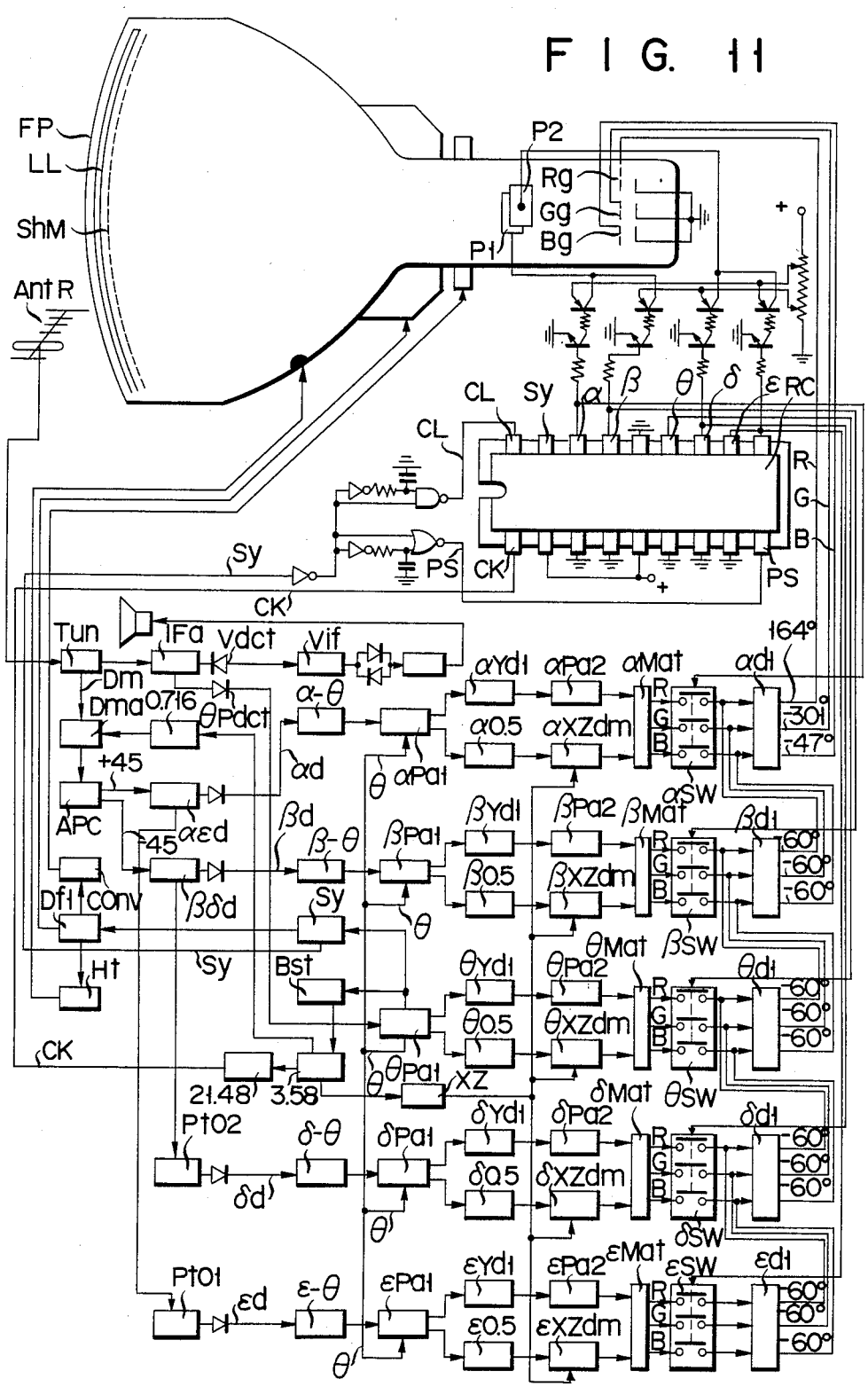
FIG. 11 is a diagram of a receiver embodying the present invention.

FIG. 11 is a block diagram of a stereoscopic color television receiver according to the invention. An input from a receiver antenna Ant R is supplied to a tuner circuit Tun and then amplified by a first intermediate frequency amplifier circuit IFa which contains a video signal from the central camera $\theta c$, and an audio signal. The output from the circuit IFa is detected by Vdct and $\theta$Pdct. The output of Vdct is supplied to an audio intermediate frequency amplifier circuit Vif, and the output of $\theta$Pdct is supplied to a first video amplifier circuit $\theta$Pa1 for the central camera $\theta c$. All the other circuits $\theta$Pa1 to $\theta$Mat in the following stages are the same as those used in the existing color television receiver and are not described here.

From the tuner circuit Tun there is taken a composite video difference signal modulated wave Dm as a divided frequency of 0.715909 MHz, i.e., one fifth of the color subcarrier 3.579545 MHz, which is amplified by Dma and then is split by an automatic phase control circuit APC into a 45° wave and a −45° wave, from which $\alpha\epsilon d$ and $\beta\delta d$ are obtained. $\alpha\epsilon d$ is detected by positive halfwave rectification, thus producing $\alpha d$, i.e. a video difference signal $\alpha - \theta$. $\alpha\epsilon d$ is subjected to phase reversion by means of Pto1 and then detected by positive halfwave rectification, thereby producing $\epsilon d$, i.e. a video difference signal $\epsilon - \theta$. It should be noted here that a wave has its phase reversed every time it is amplified by an ordinary amplifier circuit and that measures must be taken to maintain the bias of the amplifier. Taking such measures, $\beta\delta d$ is detected by positive halfwave rectification, thus providing $\beta d$, i.e. a video difference signal $\beta - \theta$. Further, $\beta\delta d$ is subjected to phase reversion by means of Pto2 and then detected by positive halfwave rectification, thus producing $\delta d$, i.e. video difference signal $\delta - \theta$.

Figure 12:
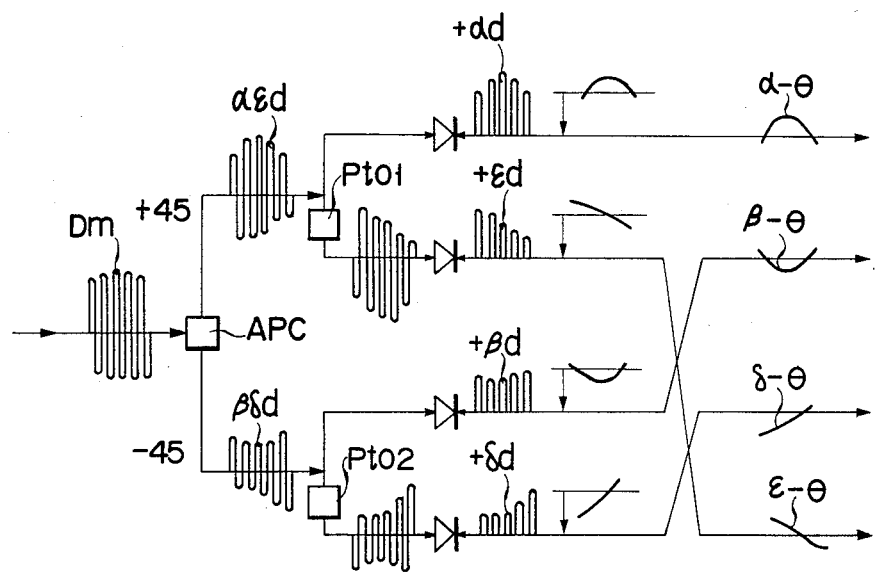
FIG. 12 is a diagram illustrating how video difference signals are restored.

FIG. 12 illustrates how video difference signals $\alpha - \theta$, $\beta - \theta$, $\delta - \theta$ and $\epsilon - \theta$ are obtained from the composite video difference signal Dm. It should be recalled that signals obtained at the final process, i.e. video difference signals $\alpha - \theta$, $\beta - \theta$, $\delta - \theta$ and $\epsilon - \theta$, must have their biases returned to the same level as in the transmitting side. To the four video difference signals thus produced, which are carried as the fifth harmonic of fd with the phse of a vector sum of the three primary colors, the video signal $\theta$ from the central camera is added as shown in FIG. 11, thus generating video signals $\alpha = \alpha - \theta + \theta$, $\beta = \beta - \theta + \theta$, $\delta = \delta - \theta + \theta$ and $\epsilon = \epsilon - \theta + \theta$. The video signals $\alpha$, $\beta$, $\delta$ and $\epsilon$ are amplified by $\alpha$Pa1, $\beta$Pa1, $\delta$Pa1 and $\epsilon$Pa1, respectively. They are then processed in the same way as the output from $\theta$Pa1 by the circuits of the following stages. They are supplied to matrix circuits $\alpha$Mat, $\beta$Mat, $\delta$Mat and $\epsilon$Mat. The five video signals thus obtained are supplied to matrix circuits $\alpha$Mat, $\beta$Mat, $\theta$Mat, $\delta$Mat and $\epsilon$Mat, respectively, and each of them is split into three primary colors R, G and B. Five pictures are reproduced at the same time for each color.

Figure 13:
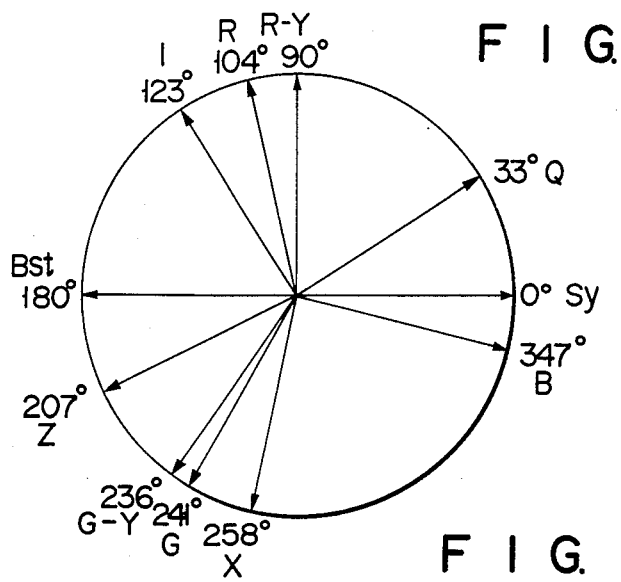
FIG. 13 shows the phase angles of signals transmitted by a color subcarrier wave.

FIG. 13 shows the phase relation to the three primary colors R, G and B and chrominance signals I, Q, X, Z and the like all contained in 1 Hz of the color sub-carrier wave of the above-mentioned five pictures. As already mentioned, five sets of R, G and B, which constitute a stereoscopic picture, are restored at the same time. To reproduce the three primary colors of all the sets simultaneously, five 3-electron gun assemblies must be used. But a cathode ray tube with five 3-electron gun assemblies does not fit into mass-procution.

The present invention uses only one set of three electron guns for three primary colors R, G and B and which are arranged in a vertical line. It is therefore necessary to supply three color video signals which are generated by the same camera and which represent a picture element to the 3-gun assembly at the same time. It is also necessary to reproduce, within 1 Hz of the color sub-carrier wave, the five color pictures which are in stereoscopic relation, i.e. $\alpha$RGB, $\beta$RGB, $\theta$RGB, $\delta$RGB and $\epsilon$RGB. In the present invention the five sets of stereoscopic color picture signals are applied, within 1 Hz next to the 1 Hz of the color sub-carrier wave, to common control grids Rg, Gg and Bg of three primary colors R, G and B and a stereoscopic picture is reproduced on the phosphor screen while shifting electron beams left and right in five steps and in a timed relation to the application of picture signals to the control grids.

Figure 14:
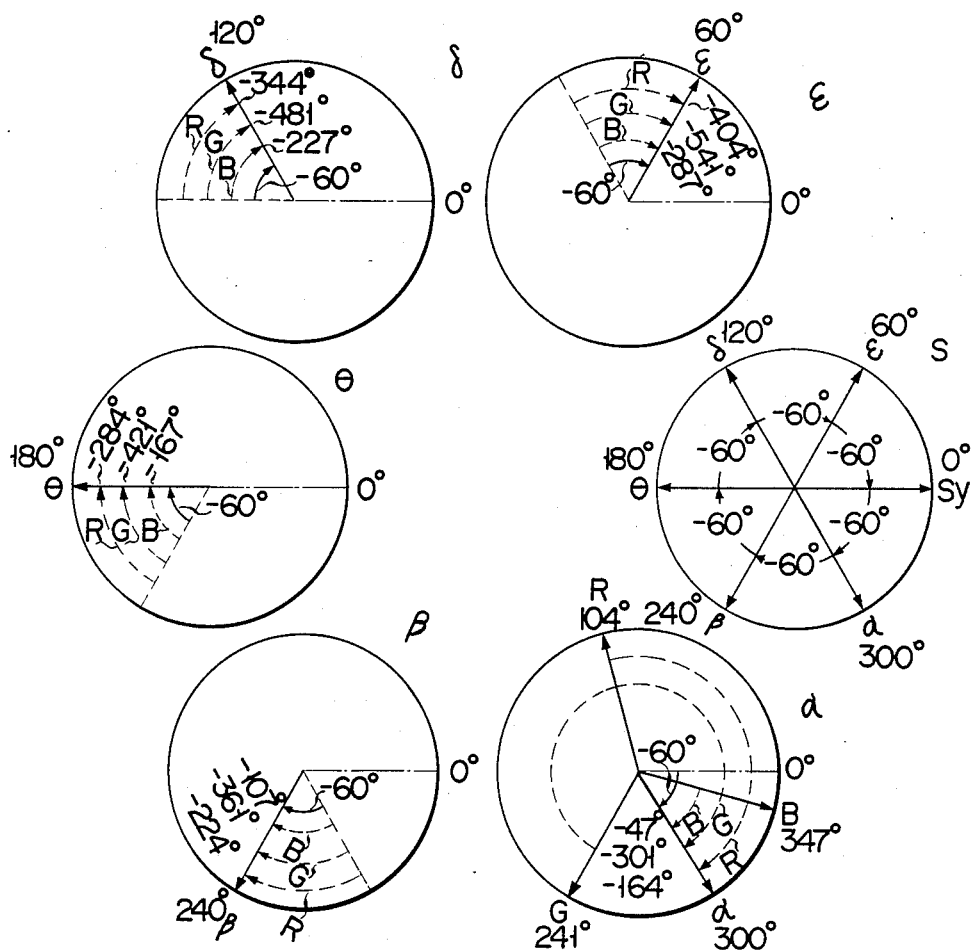
FIG. 14 represents angles at which pictures are delayed to compose a stereoscopic picture according to the invention.

FIG. 14 is a diagram for explanation of timing. S shows the order of arrangement of five pictures α, β, θ, δ and ε constituting a stereoscopic picture. Sy designates a synchronization signal which make the five pictures take positions corresponding to the electron beams, once every 1 Hz. Let the position of the signal Sy be called "0° position". Then, as shown in FIG. 13, R takes +104° position, G +241° position, and B +347° position. If α shown in FIG. 14 takes −60° position which is delayed by 1 Hz of the color sub-carrier, R, G and B must take −164°, −301° and −47° positions, respectively, in order to put the three primary colors of the picture α upon this position. Similarly, if the picture β takes −120° position which is delayed by 1 Hz of the color sub-carrier R, G and B must take by −224°, −361° and −107° positions which are delayed 60° from α, respectively, in order to put the three primary colors of the picture β upon this position. Similarly, in the case of the picture θ, R, G and B take −284°, −421° and −167° positions which are delayed 60° from β, respectively. In the case of the picture δR, G and B take −344°, −481° and −227° positions, respectively. In the picture εR, G and B take −404°, −541° and −287° positions, respectively. The delay circuit comprises αd1, βd1, θd1, δd1 and εd1, shown in FIG. 11, which are cascade-connected and the outputs of which are sequentially supplied to the control grids Rg, Gg and Bg of the cathode ray tube. Concurrently, a ring counter RC shifts electron beams to reproduce on the phosphor surface the five pictures which are switched from one to another every time the color sub-carrier wave shifts 60°.

Figure 15:
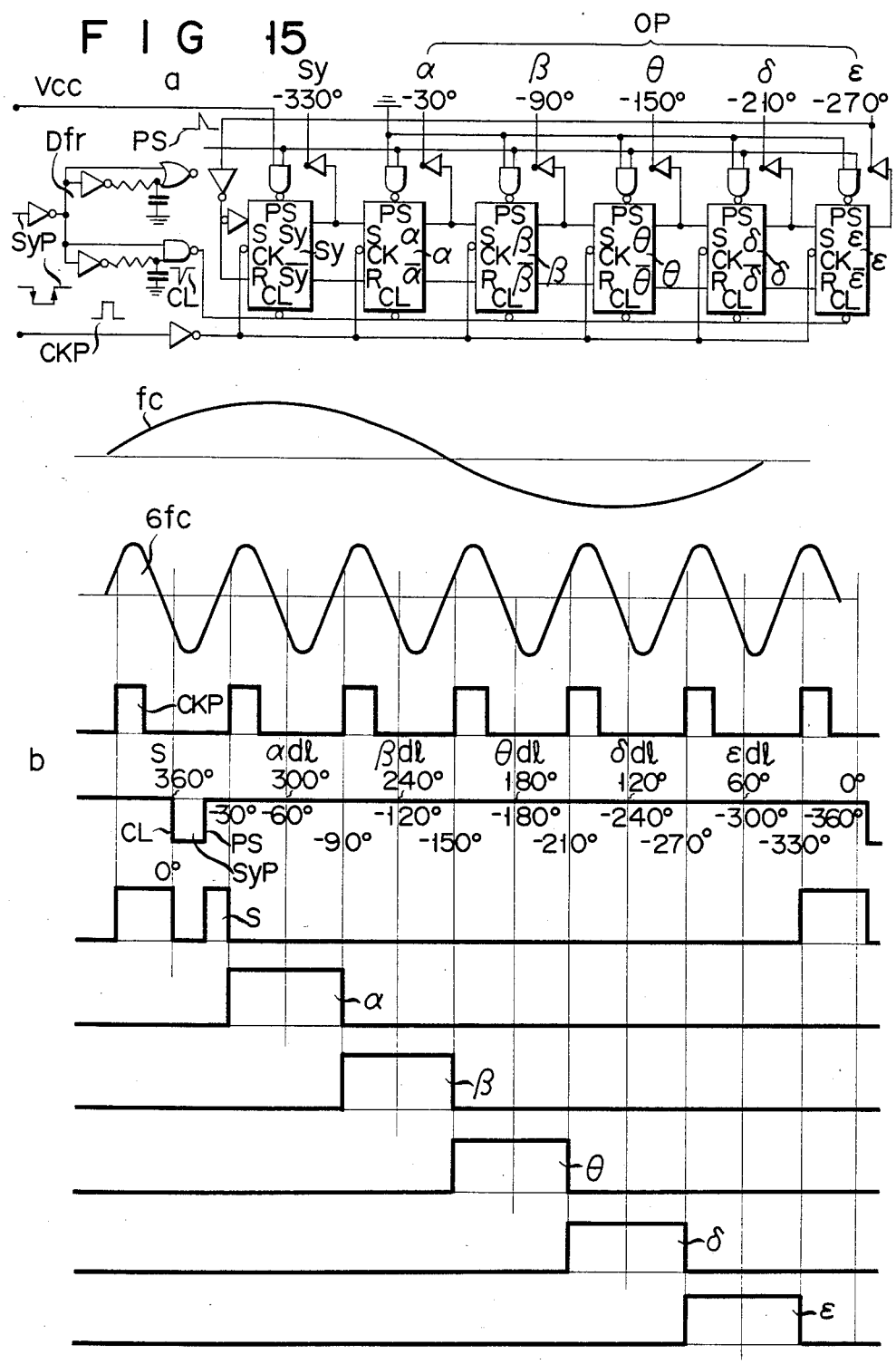
FIG. 15 shows a ring counter circuit used in the present invention and illustrates the timing of switching the ring counter circuit.

FIG. 15 shows the ring counter RC and illustrates how the counter RC operates. The counter RC comprises 6-bit RS flip-flop circuits of master-slave type each having preset and clear terminals. Clock pulse CKP for driving each of the RS flip-flop circuits has a frequency of 21.47727 MHz, which is six times the frequency of the color sub-carrier. As shown in FIG. 15(a), when the ring counter RC is in an operative state, every time + pulse is applied to CKP an output is shifted in the order of α→β→θ→δ→ε at the output side OP and for every 60° shift of color sub-carrier. FIG. 15(b) is a timing chart showing how the ring counter RC functions. During the 1 Hz period of the color sub-carrier wave fc six clock pulses CKP are generated. A little after the 0° position of clock pulse CKP a synchronization pulse SyP is placed. The pulse SyP is supplied to a differential circuit Dfr, which generates a negative kick pulse and a positive kick pulse. The positive kick pulse is supplied to the preset terminals PS of the flip-flops, and the negative kick pulse to the clear terminals CL of the flip-flops. When the negative kick pulse is supplied to the clear terminals CL as the synchronization pulse SyP falls, the ring counter RC is cleared, whatever count value it had immediately before the supply of the negative kick pulse. Thereafter the ring counter RC does not come into operation even if a clock pulse is supplied to its CKP terminal. When the positive kick pulse is supplied to the preset terminals PS as the synchronization pulse SyP rises, only the flip-flop Sy which is applied with Vcc comes into operation, thus generating an output Sy which takes 0° position as shown in FIG. 14. Thereafter, the output of the ring counter RC is shifted in the order of α→β→θ→δ→ε as clock pulses are supplied to the CKP terminal one after another. That is, as shown in FIG. 15, the application timings of the video signals αRGB, βRGB, θRGB, δRGB, and εRGB to three primary color grids Rg, Gg and Bg controlled by the outputs α, β, θ, δ and ε of the ring counter, are 330°–270°, 270°–210°, 210°–150°, 150°–90° and 90°–30°. As a result, five video signals αRGB, βRGG, θRGB, δRGB and εRGB as shown in FIG. 11 and corresponding to three primary color electron beams synthesize a stereoscopic color picture on the phoshor surface of the cathode ray tube and enables stereoscopic view of color television through a lenticular screen.

INDUSTRIAL APPLICABILITY

According to the present invention, two AC currents which are 90° out of phase are used so that four video difference signals may be transmitted on one carrier wave. Further, the positive halfwave and negative halfwave of either AC current are used to transmit different data. These techniques, which achieve the object of the invention, may be utilized to transmit data not only in the television systems but also in other systems.

Indeed the circuits of the system according to the invention are rather complicated because the system composes a stereoscopic picture of five pictures. But the circuits are similar ones, which makes it easy to standardize them, to fabricate them in the form of ICs, and to manufacture them in the form of LSIs. Hence, a substantial cost reduction may be well expected of the system according to the present invention. What is more, the cathode ray tube used in the system has a relatively simple structure. Especially, it is easier to coat three primary color phosphor paints on its phosphor screen than on the phosphor screen of the cathode ray tube used in the existing color television system.

I claim:

1. A stereoscopic color television transmission method comprising the steps of:

photographing an object by five video cameras each of which generates a color signal and which are equidistantly spaced in the horizontal direction;

transmitting video information detected by the central camera in substantially the same method as the transmission method used in a given color television system having assigned channels at certain reference frequencies and a certain color subcarrier frequency; and transmitting four video difference signals, using a composite video difference signal carrier wave which has been generated by amplitude modulating positive halfwaves and negative halfwaves of each of two currents having a phase difference of 90° with four video difference signals generated by subtracting the video signal detected by the central camera from the other four video signals detected by the other four cameras and synthesizing the positive and negative halfwaves.

2. A method according to claim 1, including placing said composite video difference signal carrier wave within the sideband on the opposite side of the color sub-carrier with respect to the reference frequency for an assigned channel, generating said difference signal carrier wave at 1/n (n is an integer) of the frequency of the color sub-carrier, maintaining the spectrum distribution of said carrier wave in interleaf relation with the spectrum distribution of the luminance signal from the central camera, and maintaining the bandwidth of said carrier wave within that of the channel assigned.

3. A stereoscopic color television receiving system for reproducing and combining transmitted video difference signals, comprising:
- first means including an automatic phase control circuit for dividing a transmitted composite video difference signal carrier wave into two AC waves having a phase difference of 90°;
- second means including a halfwave rectifier for dividing each of the two waves into a positive halfwave and a negative halfwave to provide four video difference signals; and
- third means including an adder circuit for adding a transmitted video signal from a central camera to each of the four video difference signals to form four corresponding video signals.

4. A stereoscopic color television receiving system according to claim 3, comprising:
- picture display means for arranging in a predetermined order five pictures constituting a stereoscopic picture, and having a phase difference of 60°, means for delaying the video signal from the central camera and said four video signals, and means for keeping the three primary colors of each picture within 1 Hz which is delayed by one hertz with respect to the color sub-carrier wave.

5. A stereoscopic color television receiving system according to claim 4, including three electron guns of a cathode ray tube arranged in a vertical line, and a shift electrode or electromagnetic coil for shifting electron beams emitted from the electron guns in synchronism with all five video signals, said shift electrode or electromagnetic coil being arranged to be controlled every one hertz of a color subcarrier wave.

6. A stereoscopic color television receiving system according to claim 5, further comprising a lenticular screen disposed between the face plate and shadow mask or meshy focusing grid of the cathode ray tube, having a convex lens effect only in the horizontal direction at a pitch equal to that of apertures of the shadow mask or meshy focusing grid, having a number of sets of three primary color phosphor stripes coated on the focal plane of the screen, said stripes extending in the horizontal direction and spaced at said pitch in the vertical direction, and having a number of black shades spaced in the vertical direction to prevent mixing of the three primary colors, and electron beams overlap in the horizontal direction on the neighboring portions of five pictures, for forming intermediate color pictures.

* * * * *